(12) United States Patent
Ish et al.

(10) Patent No.: US 10,534,541 B2
(45) Date of Patent: Jan. 14, 2020

(54) ASYNCHRONOUS DISCOVERY OF INITIATORS AND TARGETS IN A STORAGE FABRIC

(71) Applicant: Seagate Technology LLC, Cupertino, CA (US)

(72) Inventors: Mark Ish, Sandy Springs, GA (US); Siddhartha Kumar Panda, Bangalore (IN); Dileep Kumar Sharma, Bangalore (IN); Durga Prasad Bhattarai, Bangalore (IN)

(73) Assignee: Seagate Technology LLC, Cupertino, CA (US)

( * ) Notice: Subject to any disclaimer, the term of this patent is extended or adjusted under 35 U.S.C. 154(b) by 74 days.

(21) Appl. No.: 15/709,681

(22) Filed: Sep. 20, 2017

(65) Prior Publication Data
US 2018/0081558 A1 Mar. 22, 2018

Related U.S. Application Data

(60) Provisional application No. 62/396,914, filed on Sep. 20, 2016.

(51) Int. Cl.
*G06F 13/40* (2006.01)
*G06F 3/06* (2006.01)
*G06F 13/42* (2006.01)

(52) U.S. Cl.
CPC .......... *G06F 3/0607* (2013.01); *G06F 3/0655* (2013.01); *G06F 3/0688* (2013.01); *G06F 13/4022* (2013.01); *G06F 13/4282* (2013.01); *G06F 2213/0026* (2013.01)

(58) Field of Classification Search
CPC .............. G06F 3/0607; G06F 13/4282; G06F 13/4022; G06F 3/0688; G06F 3/0655; G06F 2213/0026
See application file for complete search history.

(56) References Cited

U.S. PATENT DOCUMENTS

| 5,185,860 | A | 2/1993 | Wu |
| 5,987,515 | A | 11/1999 | Ratcliff et al. |
| 6,098,140 | A | 8/2000 | Pecone et al. |
| 6,167,444 | A | 12/2000 | Boden et al. |
| 7,433,700 | B2 | 10/2008 | Zlateff et al. |
| 7,493,472 | B2 | 2/2009 | Baxter |

(Continued)

*Primary Examiner* — Tasnima Matin
(74) *Attorney, Agent, or Firm* — Hall Estill Attorneys at Law (57) ABSTRACT

Method and apparatus for asynchronous discovery of processing and storage nodes coupled via an expander switch in a fabric. In some embodiments, an initiator device operates as a processing node to transfer data to and from a non-volatile memory (NVM) of a target device at a storage node. One of the initiator or target devices is activated prior to the other device. The second activated device broadcasts a discovery command responsive to the activation of the second activated device and prior to receipt of a request for the discovery command from the first activated device. The first activated device processes the discovery command to establish an I/O communication link between the first activated device and the second activated device. The discovery command may include a non-volatile memory express (NVMe) controller list, and the NVM may be arranged as one or more NVMe namespaces.

20 Claims, 7 Drawing Sheets

(56) References Cited

U.S. PATENT DOCUMENTS

| | | | |
|---|---|---|---|
| 8,326,919 | B1 | 12/2012 | Takkallapally et al. |
| 8,489,727 | B2 | 7/2013 | Schwarz et al. |
| 8,732,354 | B1 | 5/2014 | Salli |
| 8,880,747 | B2 | 11/2014 | Bolen |
| 9,285,995 | B2 | 3/2016 | Malwankar |
| 9,465,763 | B2 | 10/2016 | Pelt et al. |
| 9,645,902 | B2 | 5/2017 | Breakstone et al. |
| 9,684,575 | B2 | 6/2017 | Breakstone et al. |
| 2004/0160973 | A1 | 8/2004 | Jones |
| 2005/0021751 | A1* | 1/2005 | Block .................. G06F 9/54 709/225 |
| 2008/0098321 | A1 | 4/2008 | Krithivas |
| 2012/0233399 | A1* | 9/2012 | Kurokawa .......... H04L 12/4625 711/114 |
| 2012/0254462 | A1* | 10/2012 | Sengupta ............ G06F 11/2071 709/238 |
| 2013/0238930 | A1* | 9/2013 | Umbehocker ...... G06F 11/2092 714/6.32 |
| 2014/0281040 | A1* | 9/2014 | Liu ..................... G06F 9/50 710/3 |
| 2014/0365714 | A1 | 12/2014 | Sweere et al. |
| 2015/0378606 | A1* | 12/2015 | Huang .................. G06F 3/061 711/103 |
| 2016/0085718 | A1 | 3/2016 | Huang |
| 2017/0102874 | A1* | 4/2017 | Ouchi .................. G06F 3/06 |
| 2017/0149920 | A1* | 5/2017 | Sammatshetti ..... H04L 67/2842 |
| 2017/0177222 | A1 | 6/2017 | Singh et al. |

\* cited by examiner

NVMe CONTROLLER LIST FORMAT

ONLY TARGET COMES ONLINE

FIG. 8

TARGET COMES ON LINE, INITIATOR ALREADY ONLINE

FIG. 9

ONLY INITIATOR COMES ONLINE

FIG. 10

INITIATOR COMES ON LINE, TARGET ALREADY ONLINE

FIG. 11

DISCOVERY REQUEST CMD BY INITIATOR

| BITS ⟶ | 31 | 23 | 15 | 7 0 |
|---|---|---|---|---|
| DW0 | CMD_LENGTH_BYTES | | RESERVED | CMD_TYPE |
| DW1 | RESERVED | | | |
| DW2 | RESERVED | | | |
| DW3 | RESERVED | | | |

FIG. 12

DISCOVERY RESPONSE CMD BY TARGET

| BITS ⟶ | 31 | 23 | 15 | 7 0 |
|---|---|---|---|---|
| DW0 | CMD_LENGTH_BYTES | | RESERVED | CMD_TYPE |
| DW1 | INSTANCE_COUNT | | | |
| DW2 | RESERVED | | | |
| DW3 | RESERVED | | | |
| DW4 | RESERVED | | | |
| DW5 | INSTANCE_ID(0) | | | |
| DW6 | VENDOR_ID | | DEVICE_ID | |
| DW7 | SUBSYSTEM VENDOR_ID | | SUBDEVICE_ID | |
| DW8 | INSTANCE_ID(1) | | | |
| DW9 | VENDOR_ID | | DEVICE_ID | |
| DW10 | SUBSYSTEM VENDOR_ID | | SUBDEVICE_ID | |
| . . . | . . . | | | |
| DW((N-1) * 3) + 5 | INSTANCE_ID(N-1) | | | |
| DW((N-1) * 3) + 6 | VENDOR_ID | | DEVICE_ID | |
| DW((N-1) * 3) + 7 | SUBSYSTEM VENDOR_ID | | SUBDEVICE_ID | |

ASYNCHRONOUS DISCOVERY OF INITIATORS AND TARGETS IN A STORAGE FABRIC

RELATED APPLICATIONS

The present application makes a claim of domestic priority under 35 U.S.C. 119(e) to U.S. Provisional Patent Application No. 62/396,914 filed Sep. 20, 2016, the contents of which are hereby incorporated by reference.

SUMMARY

Various embodiments of the present disclosure are generally directed to automatic discovery of devices in a storage fabric where processing nodes and storage nodes asynchronously come on line at different times.

In some embodiments, a method includes steps of coupling an initiator device to a target device in a fabric using an expander switch. The initiator device has a programmable processor and associated programming stored in a memory. The target device has a programmable processor, associated programming stored in a memory and a non-volatile memory (NVM). A selected one of the initiator device or the target device is activated as a first activated device, which occurs prior to activation of the remaining one of the initiator device or the target device as a second activated device.

The second activated device broadcasts a discovery command responsive to the activation of the second activated device and prior to receipt of a request for the discovery command from the first activated device. The first activated device processes the discovery command to establish an I/O communication link between the first activated device and the second activated device. Thereafter, the initiator device operates to transfer data to and from the NVM of the target device across the fabric via the I/O communication link.

In further embodiments, an apparatus device comprises a target device, an initiator device and an expander switch. The target device has at least one programmable processor, associated programming stored in a memory and a non-volatile memory (NVM). The target device is configured to store data to the NVM at a storage node of a fabric during an activated state of the target device. The target device is further configured to, responsive to a transition of the target device from a deactivated state to the activated state, broadcast a discovery response across the fabric having information that identifies a physical configuration of the NVM.

The initiator device is coupled to the target device via the expander switch and has at least one programmable processor and associated programming stored in a memory. The initiator device is configured to transfer data to and from the NVM across the fabric during an activated state of the initiator device. The initiator device is further configured to, responsive to a transition of the initiator device from a deactivated state to the activated state, broadcast a discovery request across the fabric. The target device is configured to transmit the discovery response responsive to receipt of the discovery request during the activated state of the initiator device. The target device is further configured to establish an I/O communication link between the initiator device and the target device responsive to receipt of the discovery response from the target device.

In still further embodiments, a data storage device is configured for discovery in a fabric. The data storage device has a non-volatile memory (NVM) arranged into at least one non-volatile memory express (NVMe) namespace. A control circuit is configured to broadcast, across a fabric, a discovery command responsive to transitioning of the data storage device from an inactive to an active state and prior to receipt of a request for the discovery command from an initiator device coupled to the data storage device using an expander switch of the fabric. The control circuit is further configured to subsequently broadcast the discovery command responsive to receipt of the request for the discovery command from the initiator device, the discovery command comprising an NVMe controller list that describes a physical configuration of the data storage device.

DETAILED DESCRIPTION

Data storage devices are used to store and retrieve computerized user data in a fast and efficient manner. Data storage devices can take a variety of forms, such as hard disc drives (HDDs) that utilize rotatable media, solid state drives (SSDs) that use solid-state semiconductor memory (e.g., NAND flash), and hybrid drives that use multiple forms of memory.

Storage devices can be incorporated into a computer network, or fabric. Various computing nodes in the fabric communicate using a suitable protocol to transfer data between host devices and the storage devices.

The Non-Volatile Memory Express (NVMe) Specification is a particularly suitable interface protocol for managing high speed accesses in fabrics that utilize a Peripheral Component Interconnect Express (PCIe) serial bus configuration. NVMe is particularly optimized for enterprise and client solid state drive (SSD) environments by providing direct Input/Output (I/O) access to the local non-volatile memory (NVM). NVMe helps to reduce latency of read and write operations by supporting deep command queues, simplified command decoding and processing, and robust error reporting and handling.

One feature of the NVMe standard is the ability to specify regions of storage as separate namespaces. A namespace is defined as an addressable domain in the NVM having a selected number of storage blocks that have been formatted for block access.

A namespace can constitute a portion of a storage device, the entire storage device, or can span multiple storage devices. A namespace ID (NSID) is a controller unique identifier for the associated namespace (NS). A host can access a particular NVM by specifying the namespace, the controller ID and an associated logical address for the block or blocks (such as logical block addresses, LBAs).

While operable to enhance parallel data transfer paths within a storage fabric, the detection and management of namespaces can present a number of challenges, particularly in large fabrics. Existing storage devices in a fabric can be activated (transitioned to an online state) at various times, and new storage nodes can be added to the fabric to expand the available data storage capacity at substantially any time. Because of this, it can be difficult to maintain an accurate, up-to-date namespace map of the various available namespaces in a fabric, as well as to distribute the map to all of the existing processing nodes in a fabric that utilize the map.

Various embodiments of the present disclosure are generally directed to a method and apparatus for detecting storage devices in a fabric using a decentralized, asynchronous approach. As explained below, the various techniques disclosed herein eliminate the need to generate and maintain a centralized map of all available processing and storage nodes in the fabric. Instead, localized maps are independently generated and maintained by the various processing modes in a near real-time manner.

In some embodiments, the storage fabric has three main types of components: (1) processing nodes or devices that use storage; (2) storage nodes or devices that provide storage; and (3) expanders that provide operational interconnections between the processing nodes and the storage nodes. The processing nodes are referred to as initiators or initiator devices, the storage nodes are referred to as targets or target devices, and the expanders are referred to as switches. The initiators and targets may be realized as servers or other network accessible devices having various elements including programmable processors, local and NVM memory, communication circuits, etc.

The targets include one or more associated data storage devices to provide data storage capabilities for use by the initiators. The data storage devices may take the form of NAND flash based SSDs, HDDs, hybrid devices, etc. The local storage associated with a given target may be formatted into one or more NVMe namespaces.

It is contemplated that the respective initiators and targets do not become activated, or transition to an online state, at the same time. Instead, the respective targets and initiators will tend to come online at different times, and in different orders. This is commonly observed in large scale data storage systems where the respective elements may be geographically distributed. New initiators and targets may also become available as additional resources are added to expand the size of the fabric.

The various embodiments provide a system whereby, as the respective initiators and targets come online, the respective resources can be located in real time to support I/O data transfer operations between the initiators and targets, as facilitated by the switches.

Each target generates a controller list as a listing of the storage device or devices under the control of the respective target. The controller list may be formatted in accordance with the NVMe standard. Data communications may take place using a variety of ways, including use of a PCIe bus. The controller list may utilize NVMe namespaces to uniquely identify each available data storage device, or groupings/portions thereof. Unique worldwide name (WWN) conventions may be applied to identify each storage device.

A separate NVMe controller list is generated by each target. A virtual NVMe device list is formed by a driver circuit of each initiator that lists all of the known storage devices from the targets discovered by that initiator.

Because the initiators and targets in the fabric are capable of coming online at different times, various scenarios are envisioned. A first scenario involves a given target being activated prior to the activation of an associated initiator. A second scenario involves a given initiator being activated prior to the activation of an associated target. In each case, every activated device (initiator or target) initially broadcasts a discovery command to the fabric once the device has come online; initiators issue a discovery request command and targets issue a discovery response command. Previously activated targets will receive and process the discovery request commands, and previously activated initiators will receive and process the discovery response commands.

Once a connection is made, the target forwards the NVMe controller list to the initiator so that the initiator has an ID and MAC address table for that node. It is envisioned that the various nodes periodically send out unsolicited discovery requests and discovery responses through the network, although such is not necessarily required; in other embodiments, a single output command is sent by a device that has initially come online, after which the device waits to receive commands from other devices that subsequently come online to initiate connections.

Each request will generally have ID information associated with it so that, if a connection is already established, it can be ignored. New information can result in further actions such as additions to or deletions from an existing virtual NVMe device list.

As noted above, conventional systems tend to accumulate all the data regarding the available initiators and targets in a fabric into a master map (list) which is then referenced as new nodes (storage or processing) come online. The present disclosure eliminates the need to generate and maintain such a master list. This saves a significant amount of processing overhead activity to maintain the master list. The larger a network becomes, and the more volatile it is in terms of new nodes being added or removed, the harder it is for a centralized processor to maintain an accurate and up-to-date map of the system.

Another benefit of the present disclosure as compared to the use of a conventional master mapping list of all of the processors and all of the available storage devices is that different initiators may have different maps of the available storage in the system. That is, a first initiator may identify a first group of targets and associated storage devices and a second initiator may identify a second group of targets and associated storage devices. The first and second groups may be mutually exclusive, may partially overlap, or may be identical. The adaptive nature of the system provides enhanced flexibility; for example, an initiator may require a certain level of system resources and once this is achieved, the initiator does not continue to acquire access to additional resources. Separate communications between initiators, and separate communications between targets, can take place as required to ensure level loading, data replication, etc.

Figure 1:
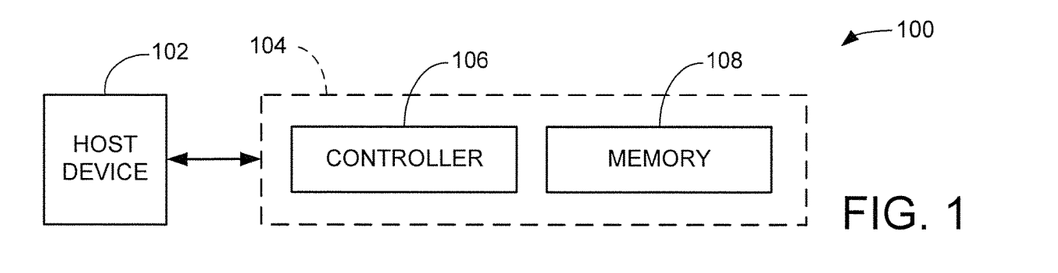
FIG. 1 is a functional block representation of a data processing system having a host device and a storage device constructed and operated in accordance with various embodiments of the present disclosure.

These and other features and advantages of various embodiments can be understood beginning with a review of FIG. 1 which shows a data processing system 100. The data processing system 100 includes a host device 102 operably coupled to a data storage device 104.

While the host device 102 and the data storage device 104 in FIG. 1 can each take a variety of forms, it is contemplated for purposes of the present discussion that the host device 102 is a local controller, computer or server that includes a programmable processor or other control circuitry to interface with the storage device 104 and network communication capabilities to communicate with other devices via a fabric.

The data storage device 104 will be contemplated as comprising one or more solid state drives (SSDs), although other forms of storage device(s) can be used including but not limited to a hard disc drive (HDD), hybrid drive, portable drive, optical drive, an integrated memory module, a multi-device storage enclosure, etc.

The SSD 104 may be incorporated into the host device as an internal component or may be an external component accessible via a communication pathway with the host device 102 including a cabling connection, a wireless connection, a network connection, etc. The SSD 104 includes a controller 106 and non-volatile memory (NVM) 108. The controller may be a hardware based or programmable processor circuit. The NVM in this case is contemplated as comprising NAND flash.

Figure 2:
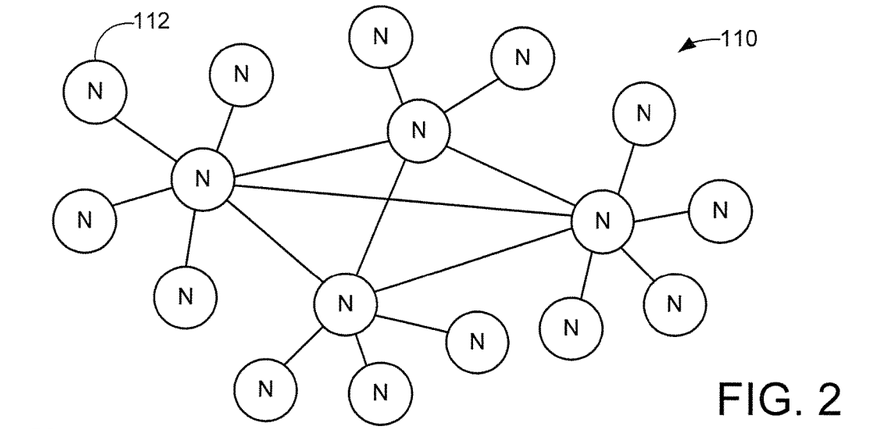
FIG. 2 shows a storage fabric as a plurality of interconnected computing nodes in a computer network.

FIG. 2 shows a distributed computer network 110, also referred to as a fabric or storage fabric. The network 110 has a number of interconnected nodes 112. The nodes 112 may represent local user systems configured as processing nodes, storage nodes, etc. Other arrangements can be used. Any node in the system can communicate directly or indirectly with any other node. The fabric 110 can include a private network, a public network, a data processing center, etc. A discovery scheme will now be described to enable various elements of the fabric to be discovered by other elements.

Figure 3:
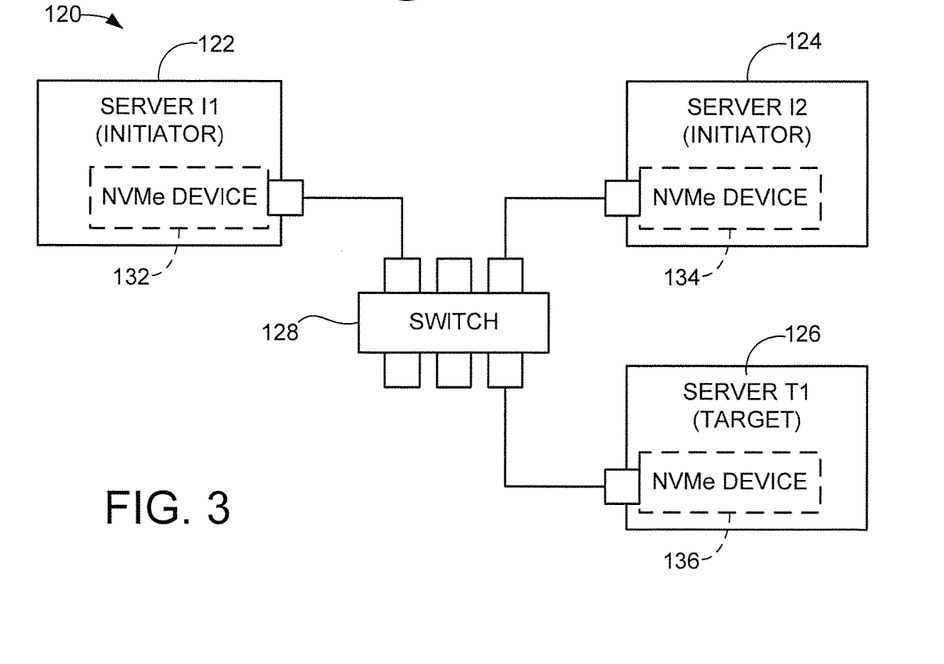
FIG. 3 shows aspects of the fabric of FIG. 2 in some embodiments.

FIG. 3 shows a simplified functional representation of another fabric 120 similar to that shown in FIG. 2. The fabric 120 includes nodes including servers 122, 124 and 126 interconnected by an expander or switch 128 (also referred to as an "expander switch"). The servers 122, 124 are characterized as initiators or initiator devices and are denoted as Servers I1 and I2. These represent processing servers or nodes that transfer data to and from NVM of the server 126, referred to as a target or target device (Server T1). For clarity, the routing of communication signals between the respective servers is exemplified by, but does not necessarily require, the use of a switch as shown.

Each of the servers 122, 124 and 126 include physical NVMe devices denoted respectively at 132, 134 and 136. As discussed above, an NVMe device exposes a controller and set of namespaces. An NVMe namespace describes a logical block device to which applications can perform I/O operations. An NVMe driver recognizes a list of the available NVMe controllers attached to a given computing node and creates a block device for each NVMe namespace.

Figure 4:
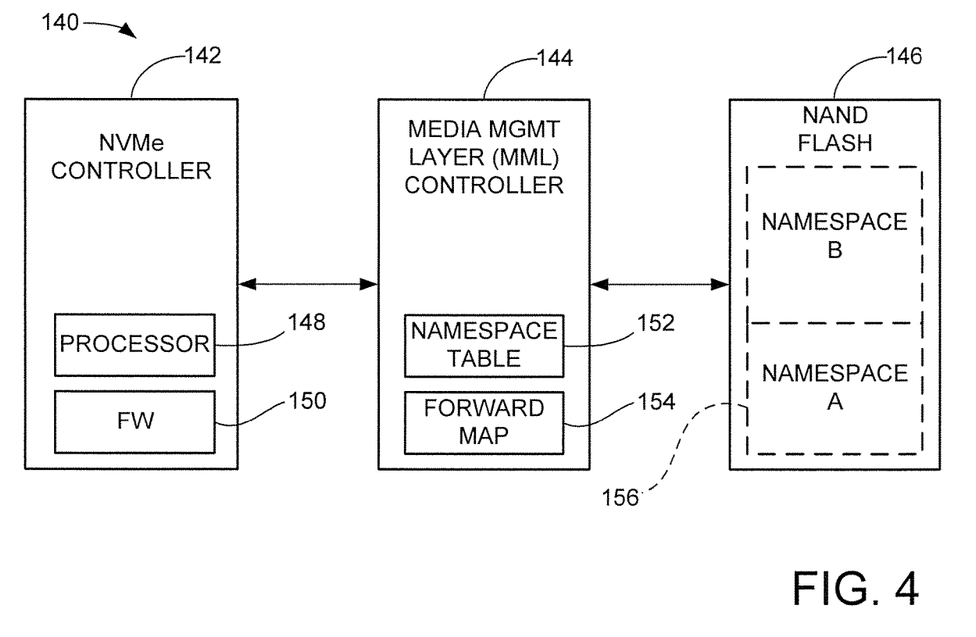
FIG. 4 shows a data storage device of the target device of FIG. 3 in some embodiments.

A functional block representation of a selected SSD 140 coupled to the target 126 is shown in FIG. 4. The SSD 140 includes an NVMe controller 142, a media management layer (MML) 144 and a NAND flash array 146. The NVMe controller 142, also referred to as a storage controller circuit, includes one or more programmable processor circuits 148 that execute programming instructions (firmware, FW) 150 to communicate with the system and control accesses to data storage in the flash 146. The NVMe controller 142 will have a unique namespace controller ID (NCID) to identify the controller.

The MML 144 may include a namespace table 152 and a forward map 154 as data structures in memory associated with data stored in the flash. Per the NVMe specification, that portion of the NAND flash 146 available for storage of data blocks is divided into a number of namespaces 156. Two such exemplary namespaces are identified as namespace Namespace A and Namespace B, although any number of namespaces can be used.

Each namespace has an associated total amount of block storage capacity. Data transfers include values from the host that indicate logical addresses (e.g., logical block address, LBA) values, the namespace to which the data are to be stored to/retrieved from, and the namespace controller ID associated with the NVMe controller 142. The MML controller 144 uses the namespace table 152 and the forward map 154 to locate and control data transfers responsive to host commands.

Figure 5:
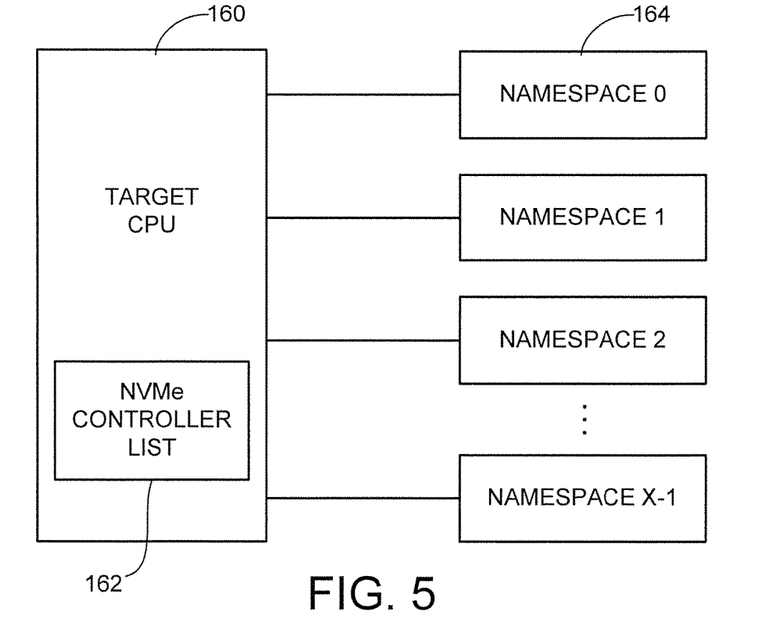
FIG. 5 shows a target controller (CPU) of the target device of FIG. 3 in some embodiments.

FIG. 5 shows a target controller 160 (also "target CPU") which is a control circuit associated with the target 126 in FIG. 3. In this embodiment, the target controller 160 generates and maintains an NVMe controller list 162 as a data structure in a suitable memory location to describe various namespaces 164 controlled by the controller 160. In FIG. 5, a total number X namespaces are controlled by the controller. Any number of namespaces can be formed among any number of storage devices. In some embodiments, each individual data storage device (e.g., SSD 140) will constitute a single namespace. In other embodiments, multiple data storage devices may be combined to provide a single namespace. In still other embodiments, multiple namespaces may be provided within a single data storage device (see e.g., FIG. 4).

In the case where a particular target controller 160 controls multiple SSDs 140 (or other data storage devices), the local device controllers (e.g., controller 142, FIG. 4) of the various SSDs may forward information to the target controller 160, which in turn aggregates this information to develop the NVMe controller list for that node.

Figure 6:
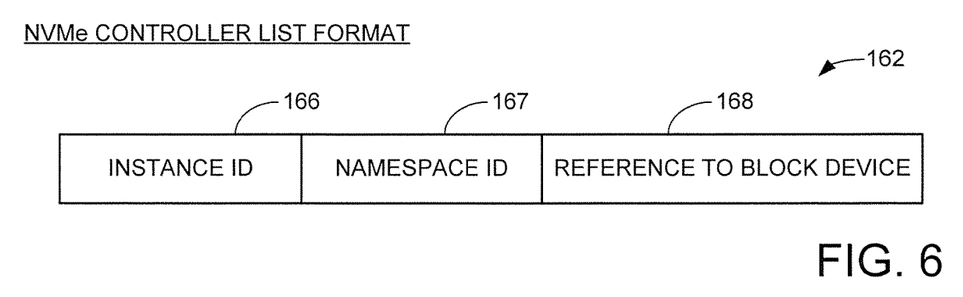
FIG. 6 shows an exemplary format for an NVMe controller list in some embodiments.

FIG. 6 shows an exemplary format for the NVMe controller list 162 maintained by the target controller 160 of FIG. 5. Further details concerning the controller list will be presented below, but at this point it will be appreciated that the controller list includes a number of fields including an instance identifier (ID) field 166, a namespace ID field 167 and a reference to block device field 168.

The term "instance" or "instance type" is commonly used in NVMe applications to describe a particular available hardware grouping as a combination of CPU, memory, storage and networking capacity. The instance ID thus represents a particular hardware grouping associated with the target. The namespace ID provides a unique namespace value for the associated namespace, and the reference to block device identifies the storage device(s) associated with the namespace and instance.

Figure 7:
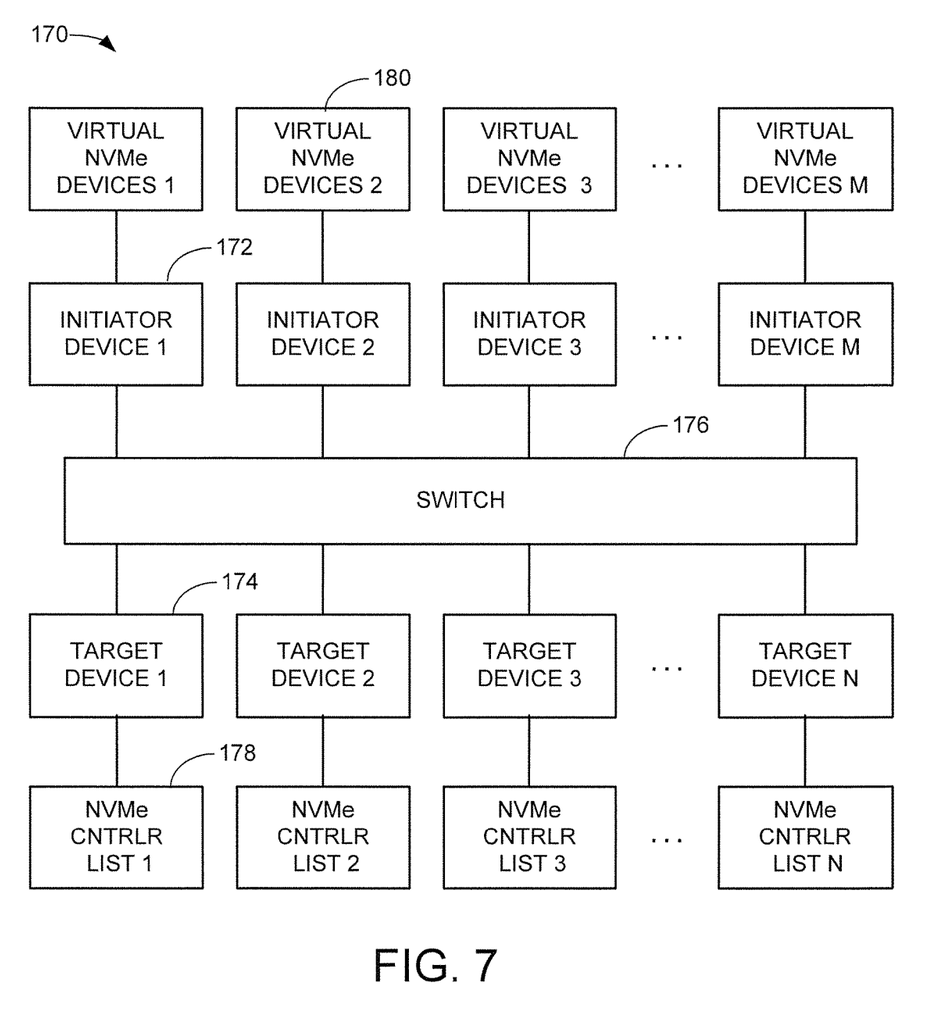
FIG. 7 shows a number of initiator devices and target devices interconnected with a switch (expander).

FIG. 7 shows an arrangement 170 as a portion of the fabric 110 in FIG. 2 to include M initiator devices 172, N target devices 174 and an interconnecting switch (expander) 176. Each target device 174 generates and broadcasts an associated controller list 178 describing the local target environment. Each controller list 178 will thus be unique to, and will describe, the associated target.

In similar fashion, each initiator device 172 generates an associated virtual NVMe devices list for the target device(s) connected to that initiator. It is contemplated that each of the virtual NVMe device listings, or maps, will be different and unique to the associated initiator since it is contemplated that not every initiator is coupled to every namespace in the fabric. However, such is merely exemplary and is not necessarily required.

Figure 8:
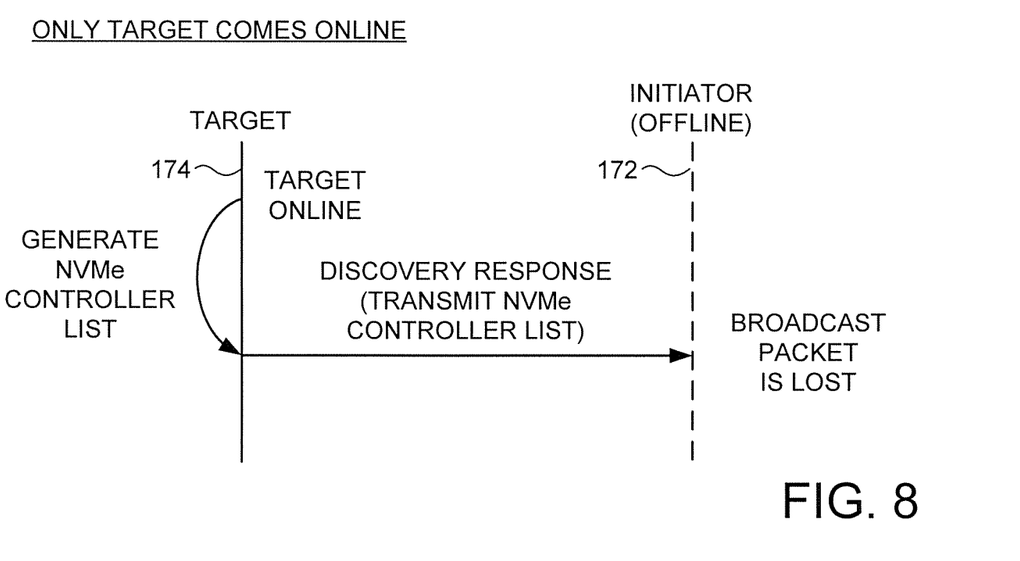
FIG. 8 is a timing sequence diagram generally illustrative of steps carried out in accordance with some embodiments in a situation where a target device comes online (is activated) without an activated initiator device.
Figure 9:
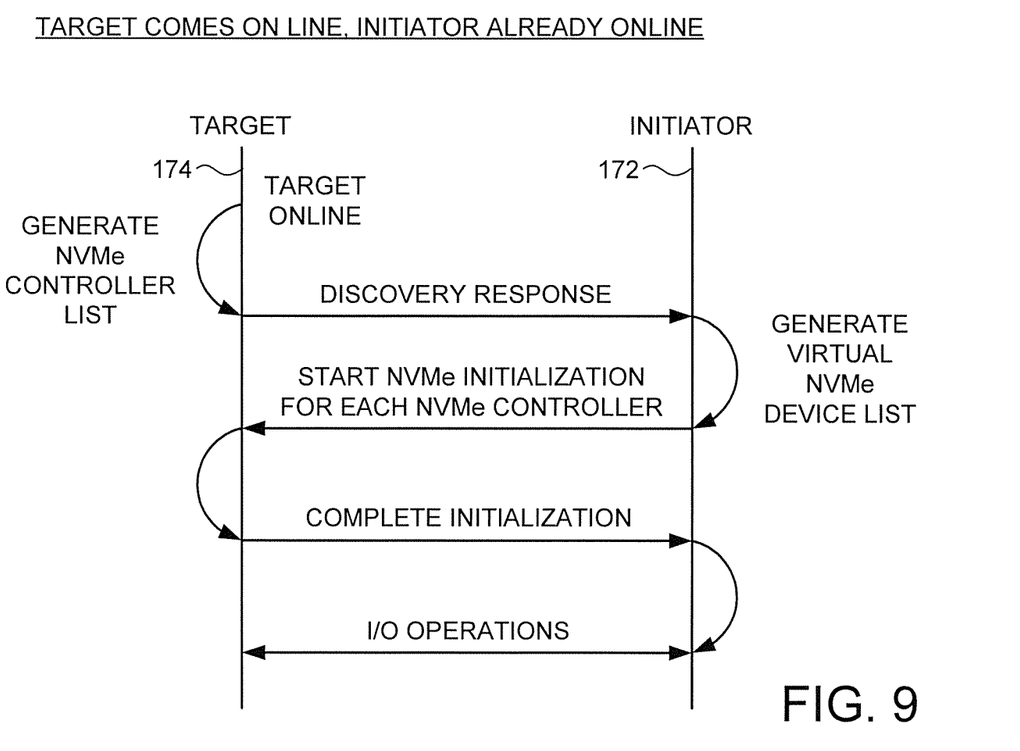
FIG. 9 is a timing sequence diagram generally illustrative of steps carried out in accordance with some embodiments in a situation where a target device comes online prior to activation of an initiator device.

FIGS. 8 and 9 provide timing sequence diagrams to generally illustrate a sequence of operations that occur once a selected target 174 comes online within the fabric 170. FIG. 8 describes a situation where the target 174 comes online without the presence of any available/responding initiators. FIG. 9 describes a situation where the target 174 comes online with the presence of one or more available/responding initiators. Each case will be discussed in turn.

As shown by FIG. 8, once the target 174 is initialized, the target performs a self-check and generates an NVMe controller list unique to the current status of the storage. This controller list is transmitted in the form of a discovery response. Because there are no available initiators to receive and process the response, the broadcast packet is lost.

FIG. 9 repeats the foregoing sequence with an activated initiator. In this case, the target comes online after the initiator is already online. For reference, the initiator can be considered a first activated device and the target can be considered a second activated device, since the target is activated after the activation of the initiator.

The broadcast discovery response from the target 174 is received and processed by the initiator 172 to generate a virtual NVMe device list 178 (FIG. 7). The initiator 172 forwards communications back to the target to initiate a connection which, when completed, enables normal I/O operations to commence.

The exchange in FIG. 9 can be described as follows:
1. When the target comes online, the target always broadcasts a discovery response command.
2. The initiator(s) in the fabric will create virtual NVMe devices based on the information received in the discovery response, if such devices have not already been created.
3. An NVMe driver of the initiator will initiate an NVMe device initialization (discovery) process to prepare the system for I/O operations.

Figure 10:
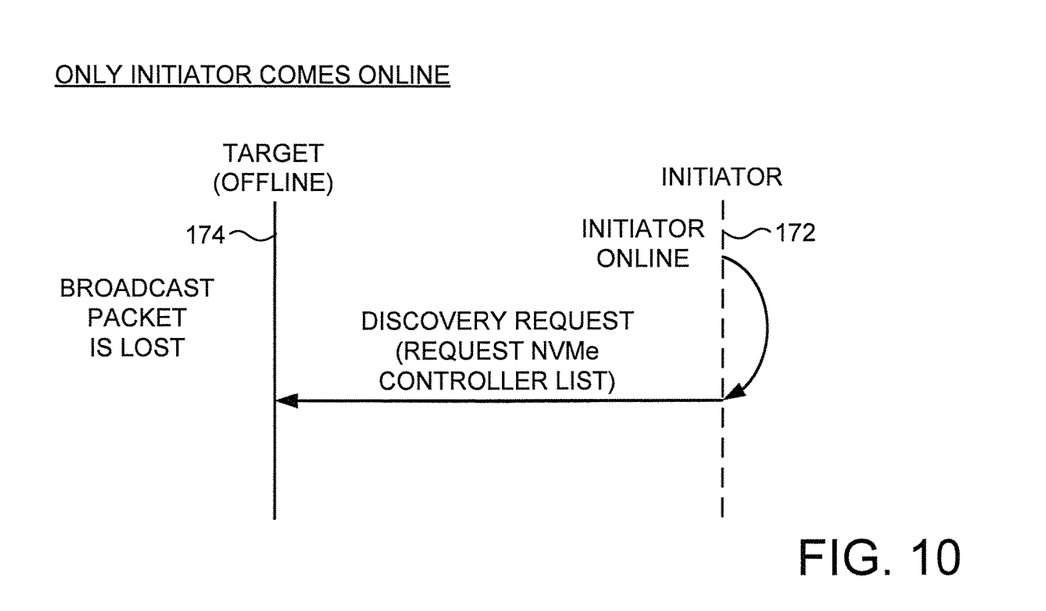
FIG. 10 is a timing sequence diagram generally illustrative of steps carried out in accordance with some embodiments in a situation where an initiator device comes online without an activated target device.
Figure 11:
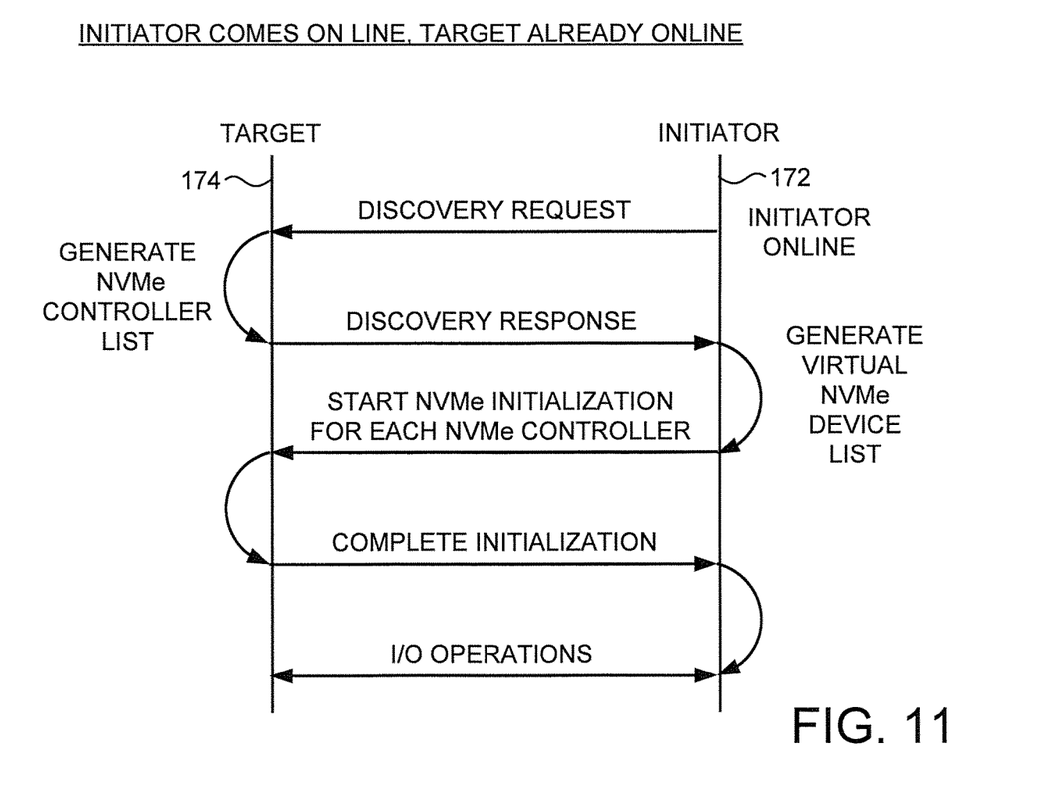
FIG. 11 is a timing sequence diagram generally illustrative of steps carried out in accordance with some embodiments in a situation where an initiator device comes online prior to activation of a target device.

FIGS. 10 and 11 provide timing sequence diagrams to generally illustrate a sequence of operations that occur once a selected initiator 172 comes online within the fabric 170. FIG. 10 describes a situation where the initiator 172 comes online without the presence of any available/responding targets. FIG. 11 describes a situation where the initiator 172 comes online with the presence of one or more available/responding targets. Each case will be discussed in turn.

FIG. 10 shows that once the initiator 172 is initialized, the initiator broadcasts a discovery request to discover existing targets. Because there are no available targets to receive and process the response, the broadcast packet is lost.

FIG. 11 repeats the foregoing sequence with an activated target. In this case, the initiator has come online after the target is already online. Thus, the target is the first activated device and the initiator is the second activated device.

The broadcast discovery request from the initiator 172 is received and processed by the target 174, which responds with a discovery response to provide the existing NVMe controller list for that target. As before, the initiator 172 uses the controller list(s) to generate the virtual NVMe device list 178 (FIG. 7). The initiator 172 forwards communications back to the target to initiate a connection which, when completed, enables normal I/O operations to commence.

The exchange in FIG. 11 can be described as follows:
1. When the initiator comes online, the initiator always broadcasts a discovery request command.
2. The target(s) in the fabric that receive the discovery request will respond with a discovery response command which includes the associated NVMe controller list.
3. The initiator will create virtual NVMe devices based on the information received in the discovery response.
4. An NVMe driver of the initiator will initiate an NVMe device initialization (discovery) process to prepare the system for I/O operations.

Figure 12:
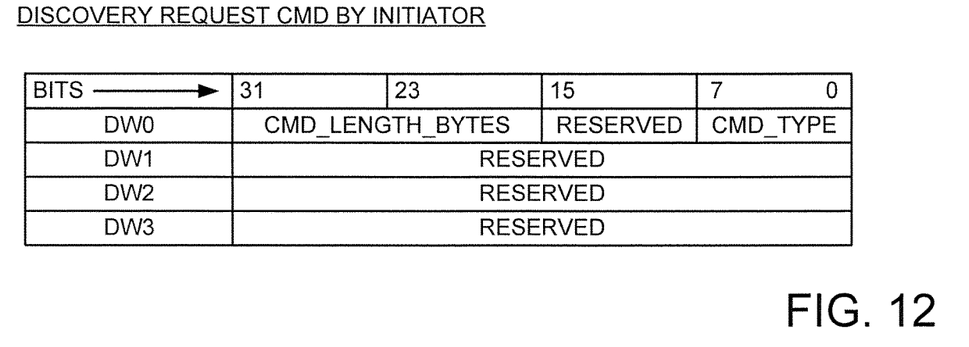
FIG. 12 is an exemplary format for the discovery request command issued by the initiator device in FIGS. 10-11.

FIG. 12 provides an exemplary format for a discovery request command issued by the initiator 172. Other formats can be used. It is contemplated that the command is 16 bytes (128 bits) in length, where one (1) byte equals eight (8) bits. The 16 byte command is broken up into four data words (DW0-DW3), each data word being four bytes (32 bits) in length. The first two bytes indicate the command length in bytes (CMD_LENGTH_BYTES), and the fourth byte identifies the command as a discovery request (CMD_TYPE). The remainder of the command is reserved, but additional information can be incorporated into the discovery request as required.

Figure 13:
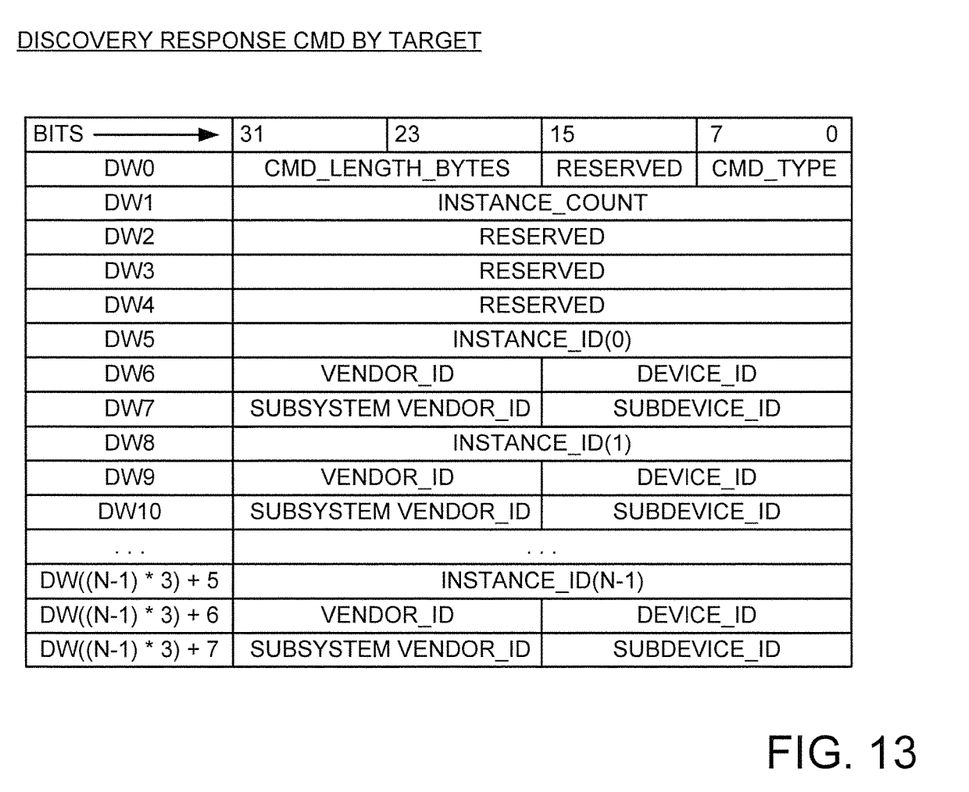
FIG. 13 is an exemplary format for the discovery response command issued by the target device in FIGS. 8-9.

FIG. 13 shows an exemplary format for a discovery response command issued by the target 174. As before, other formats can be used. The command is of variable length depending on the size of the NVMe controller list. FIG. 13 shows the discovery response command to incorporate a total of ((N−1)*3)+7 data words, each data word constituting four (4) bytes.

As before, the first data word DW0 provides command length and type information. The second data word DW1 indicates the total number of instances in the controller list (INSTANCE_COUNT). The next three data words DW2-DW4 are reserved.

Beginning with data word DW6, each instance is described using three successive data words. A total of N instances are listed, each having an INSTANCE_ID value, VENDOR_ID value, DEVICE_ID value, SUBSYSTEM VENDOR_ID value and a SUBDEVICE_ID value.

Figure 14:
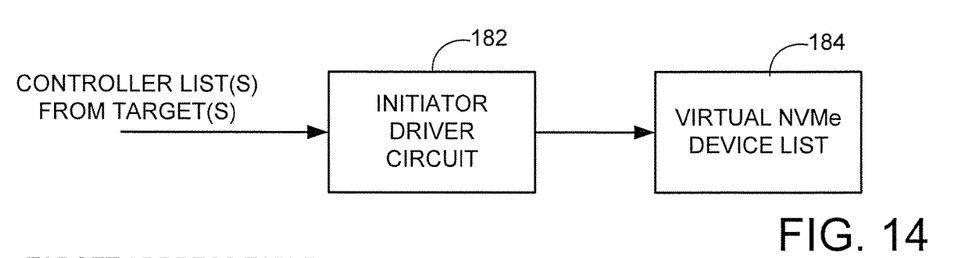
FIG. 14 is a functional block representation of an initiator driver circuit that generates the virtual NVMe device list using the controller list(s) from one or more target devices during the sequences of FIGS. 9 and 11.

FIG. 14 shows an initiator driver circuit 182 of a selected initiator 172. The initiator driver circuit 182 processes the instance information supplied in the controller list to derive a listing of virtual NVMe devices 184, which may be stored as a data structure in a local memory. It will be appreciated that the virtual NVMe device list constitutes a local map of the fabric with respect to the associated initiator device 172.

The driver circuit 182 thereafter proceeds to use the listing 184 to initiate and establish NVMe connections with each of the targets, as discussed above in FIGS. 9-11. During this connection operation, the various namespaces and other information will be identified and mapped. The driver circuit 182 may be realized in the form of a hardware circuit or a programmable processor that executes program instructions in a memory location to carry out the driver functions.

Figure 15:
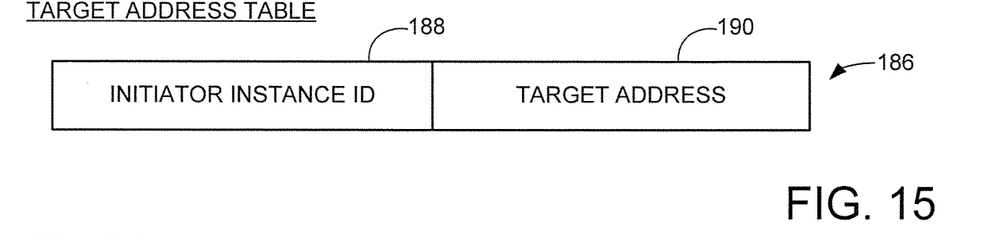
FIG. 15 is an exemplary format for a target address table generated by the initiator device.

FIG. 15 shows an exemplary format for a target address table 186 that may be generated by the driver circuit 182 during the connection process. The table 186 may be stored as a data structure in a local memory. The table may be arranged as a number of entries, each entry having an initiator instance_ID field 188 and a target address field 190. The field 188 tracks the instances of the various virtual devices to enable the NVMe driver to enumerate among them. The target node is identified by field 190 and will be a unique address depending on the fabric type. For example, in an Ethernet fabric, the address may be the target node MAC address. The target address table 186 thus maps each instance to the associated target node address.

Figure 16:
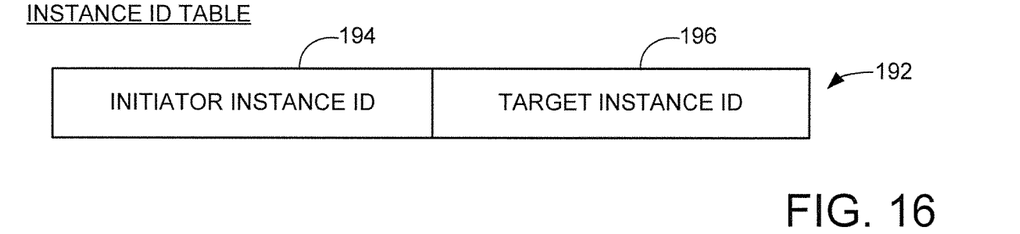
FIG. 16 is an exemplary format for an instance ID table generated by the initiator device.

FIG. 16 shows an exemplary format for an instance ID table 192. As before, the instance ID table is a data structure maintained in a suitable memory location and includes an initiator instance ID field 194 and a target instance ID field 196. In this way, the NVMe instance ID values enumerated by the driver 182 are mapped to the target instance ID from the local target (see FIG. 13). The tables 186, 192 can be used for dispatching NVMe commands from the initiator to the target.

Figure 17:
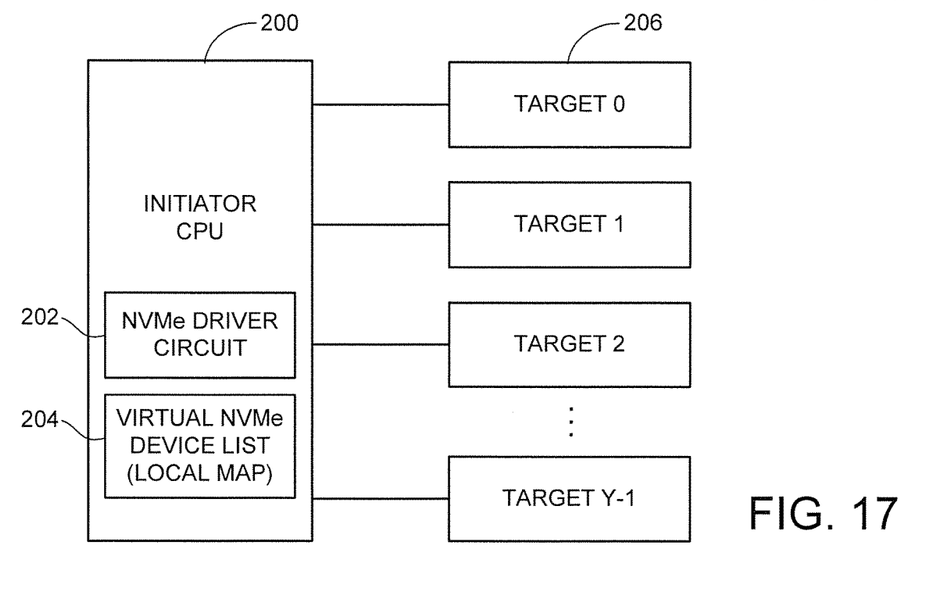
FIG. 17 shows an initiator controller (CPU) of the initiator device of FIG. 3 in some embodiments.

FIG. 17 is a functional block representation of an initiator controller (CPU) 200 of the initiator devices discussed above in accordance with some embodiments. The initiator controller 200 includes an NVMe driver circuit 202 and virtual NVMe device list 204 similar to the elements 182, 184 discussed above in FIG. 14.

The initiator controller 200 communicates with multiple targets 206 configured as discussed above. It is contemplated that as each of the targets 206 comes online in sequence, the initiator CPU performs the operations discussed above in FIG. 11 to add the associated virtualized devices to the device list.

In this way, an up-to-date local map of that portion of the fabric accessed by each initiator is separately generated and maintained by each initiator. Each initiator generates its own map without reference to receipt of a centralized map that describes the entirety of the fabric (e.g., additional targets and initiators, etc.). This eliminates the need to generate and distribute such centralized maps of devices among the various initiators and other nodes from a dedicated server. This further enables the access of the individual initiators to be individually tailored to different groups of target devices, which may be more difficult to enact and enforce if a master centralized map listing is used.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method for detecting elements in a fabric, comprising:
coupling an initiator device to a target device via an expander switch, the initiator device comprising a programmable processor and associated programming stored in a memory, the target device comprising a programmable processor, associated programming stored in a memory and a non-volatile memory (NVM);
activating a selected one of the initiator device or the target device as a first activated device prior to activating the remaining one of the initiator device or the target device as a second activated device;
broadcasting a discovery command by the second activated device responsive to the activation of the second activated device and prior to receipt of a request for the discovery command from the first activated device, the discovery command routed through the expander switch to multiple additional devices within the fabric;
using the first activated device to receive the broadcasted discovery command from the second activated device;
processing the discovery command received by the first activated device to establish an I/O communication link between the first activated device and the second activated device; and
using the initiator device to transfer data to and from the NVM of the target device across the fabric via the I/O communication link.

2. The method of claim 1, wherein the initiator device generates a local map of the fabric that identifies addresses of the NVM of the target device responsive to a controller list provided to the initiator device by the target device.

3. The method of claim 2, wherein the initiator device generates the local map without reference to a centralized map of the fabric from a dedicated server that describes additional initiator devices and additional target devices in the fabric.

4. The method of claim 1, wherein the first activated device is the target device and the second activated device is the initiator device, the discovery command is a discovery request command, the target device broadcasts a discovery response command in response to receipt of the discovery request command to the initiator device, the discovery response command comprises a controller list that describes a physical configuration of the NVM, and the initiator device generates a local map of the fabric responsive to the controller list.

5. The method of claim 1, wherein the first activated device is the initiator device and the second activated device is the target device, the discovery command is a discovery response command that comprises a controller list that describes a physical configuration of the NVM, and the initiator device generates a local map of the fabric responsive to the controller list.

6. The method of claim 1, wherein the initiator device and the target device each communicate in accordance with a specification document referred to as the non-volatile memory express (NVMe) specification, and wherein the NVM is arranged into at least one NVMe namespace as an addressable block of memory.

7. The method of claim 6, wherein the initiator device establishes I/O communication links with multiple NVMe namespaces of the target device.

8. The method of claim 1, wherein the NVM of the target device comprises a combined memory space provided from a plurality of data storage devices coupled to a controller circuit.

9. The method of claim 8, wherein each of the plurality of data storage devices comprises a solid state drive (SSD).

10. The method of claim 1, further comprising broadcasting, by the first activated device responsive to activation of the first activated device and prior to activation of the second activated device, a second discovery command which is not processed by the second activated device.

11. An apparatus, comprising:
a target device comprising at least one programmable processor, associated programming stored in a memory and a non-volatile memory (NVM), the target device configured to store data to the NVM at a storage node of a fabric during an activated state of the target device, the target device further configured to, responsive to a transition of the target device from a deactivated state to the activated state, broadcast a discovery response across the fabric a first time, the discovery response comprising information that identifies a physical configuration of the NVM;
an expander switch; and
an initiator device coupled to the target device via the expander switch and comprising at least one programmable processor and associated programming stored in a memory, the initiator device configured to transfer data to and from the NVM across the fabric during an activated state of the initiator device and to, responsive to a transition of the initiator device from a deactivated state to the activated state, broadcast a discovery request across the fabric through the expander switch, the target device further configured to transmit the discovery response a second time responsive to receipt of the discovery request during the activated state of the initiator device, the target device further configured to establish an I/O communication link between the initiator device and the target device responsive to receipt, by the initiator device, of the discovery response from the target device.

12. The apparatus of claim 11, wherein the initiator device and the target device are each activated in succession to provide a first activated device and a second activated device that is activated after activation of the first activated device.

13. The apparatus of claim 12, wherein the first activated device is the target device and the second activated device is the initiator device, the discovery command is a discovery request command, the target device broadcasts a discovery response command in response to receipt of the discovery request command to the initiator device, the discovery response command comprises a controller list that describes a physical configuration of the NVM, and the initiator device generates a local map of the fabric responsive to the controller list.

14. The apparatus of claim 12, wherein the first activated device is the initiator device and the second activated device is the target device, the discovery command is a discovery response command that comprises a controller list that describes a physical configuration of the NVM, and the initiator device generates a local map of the fabric responsive to the controller list.

15. The apparatus of claim 11, wherein the initiator device generates a local map of the fabric that identifies addresses of the NVM of the target device responsive to a controller list provided to the initiator device by the target device.

16. The apparatus of claim 11, wherein the initiator device generates the local map without reference to a centralized map of the fabric from a dedicated server that describes additional initiator devices and additional target devices in the fabric.

17. The apparatus of claim 11, wherein the initiator device is characterized as a processing node in the fabric and the target device is characterized as a storage node in the fabric, the apparatus further comprising an additional plurality of processing nodes and storage nodes interconnected to the expander switch, each of the additional plurality of processing nodes comprising an additional initiator device that generates a unique local map of the fabric responsive to controller lists supplied by the additional plurality of storage nodes so that each of the unique local maps links to a different set of NVMe namespaces in the fabric.

18. A data storage device configured for discovery in a fabric, comprising:
a non-volatile memory (NVM) arranged into at least one non-volatile memory express (NVMe) namespace; and
a control circuit configured to broadcast, across a fabric, a discovery command a first time responsive to transitioning of the data storage device from an inactive to an active state and prior to receipt of a request for the discovery command from an initiator device coupled to the data storage device using an expander switch of the fabric, the control circuit further configured to subsequently broadcast the discovery command a second time responsive to receipt of the request for the discovery command from the initiator device, the discovery command comprising an NVMe controller list that describes a physical configuration of the data storage device.

19. The data storage device of claim 18, wherein the control circuit is further configured to transfer data between the NVM and the initiator device across the fabric via the expander switch responsive to NVMe access commands transferred to the data storage device from the initiator device.

20. The data storage device of claim 18, characterized as a solid-state drive (SSD), wherein the NVM comprises NAND flash.

* * * * *